(12) United States Patent
Kim

(10) Patent No.: US 11,312,348 B2
(45) Date of Patent: Apr. 26, 2022

(54) BRAKE APPARATUS USING ELECTRIC BOOSTER AND CONTROL METHOD THEREOF

(71) Applicant: HYUNDAI MOBIS CO., LTD., Seoul (KR)

(72) Inventor: Jong Sung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 68 days.

(21) Appl. No.: 16/832,335

(22) Filed: Mar. 27, 2020

(65) Prior Publication Data

US 2021/0061246 A1 Mar. 4, 2021

(30) Foreign Application Priority Data

Aug. 27, 2019 (KR) ........................ 10-2019-0105096

(51) Int. Cl.
*B60T 13/74* (2006.01)
*B60T 7/04* (2006.01)
*B60T 8/1755* (2006.01)
*B60T 13/66* (2006.01)

(52) U.S. Cl.
CPC ............ *B60T 13/745* (2013.01); *B60T 7/042* (2013.01); *B60T 8/1755* (2013.01); *B60T 13/662* (2013.01)

(58) Field of Classification Search
CPC .... B60T 13/145; B60T 13/745; B60T 13/662; B60T 13/686; B60T 13/586; B60T 7/042; B60T 8/4081; B60T 8/1755; B60T 8/3265; B60T 2270/60; B60T 2270/604; B60T 2270/613
See application file for complete search history.

(56) References Cited

U.S. PATENT DOCUMENTS

| 6,439,674 | B1* | 8/2002 | Niino | B60L 7/003 |
| | | | | 180/165 |
| 2005/0023891 | A1* | 2/2005 | Terazawa | B60T 13/575 |
| | | | | 303/114.1 |
| 2013/0025273 | A1* | 1/2013 | Nozawa | B60T 13/686 |
| | | | | 60/545 |
| 2016/0280201 | A1* | 9/2016 | Choi | B60W 10/188 |
| 2018/0251108 | A1* | 9/2018 | Yamaguchi | B60T 8/363 |
| 2019/0315322 | A1* | 10/2019 | Goto | B60T 13/66 |
| 2020/0262409 | A1* | 8/2020 | Takahashi | B60T 13/662 |

FOREIGN PATENT DOCUMENTS

KR 10-2008-0044300 A 5/2008

* cited by examiner

Primary Examiner — Robert A. Siconolfi
Assistant Examiner — Stephen M Bowes
(74) Attorney, Agent, or Firm — NovoTechIP International PLLC

(57) ABSTRACT

A brake apparatus using an electric booster may include: an electric booster connected to a master cylinder and configured to pressure a push rod by pressurizing a reaction disk using an electromotive force of a motor with a pedal stepping force of a driver who steps on a brake pedal, and pressurize a piston of the master cylinder through the push rod; and a control unit configured to compare required brake pressure by the pedal stepping force of the driver and current brake pressure by the motor control to set pressure, and perform cooperation control through an ESC (Electronic Stability Control) and cooperation control through the electric booster.

9 Claims, 3 Drawing Sheets

BRAKE APPARATUS USING ELECTRIC BOOSTER AND CONTROL METHOD THEREOF

CROSS-REFERENCE TO RELATED APPLICATION

The present application claims priority under 35 U.S.C. § 119(a) to Korean Patent Application No. 10-2019-0105096 filed on Aug. 27, 2019 in the Korean Intellectual Property Office, which is incorporated herein by reference in its entirety.

BACKGROUND

1. Technical Field

Embodiments of the present disclosure relate to a brake apparatus using an electric booster and a control method thereof, and more particularly, to a brake apparatus using an electric booster, in which the stiffness of a reaction disk is decided to remove an influence on a pedal feel when an electric booster is applied to perform brake control, and which performs cooperation control through an ESC (Electronic Stability Control) in a non-linear section of a piston stroke depending on brake pressure and performs cooperation control through the electric booster in a linear section, and a control method thereof.

2. Related Art

In general, an electric booster-based brake system maintains the most part of the braking mechanism of an existing vacuum booster. However, the electric booster-based brake system is different in boosting mechanism from the vacuum booster in that the electric booster-based brake system boosts brake pressure using a force of the electric booster (or motor) which uses electrical energy, instead of boosting brake pressure based on a pressure difference between air pressure and vacuum pressure like the vacuum booster.

The electric booster-based brake system may be divided into two types of systems depending on whether a pedal simulator is mounted.

The electric booster-based brake system having a pedal simulator mounted therein blocks a driver's pedal stepping force which is generated when the driver steps on a brake pedal, and performs braking using only the force of the electric booster. The electric booster-based brake system makes the driver have a pedal feel similar to a pedal feel which the existing vacuum booster-based brake system has provided, using a reaction force generated by a rubber damper or spring of the pedal simulator.

On the other hand, the electric booster-based brake system having no pedal simulator mounted therein forms a pedal feel for a driver by having a part of a brake force covered by the pedal force of the driver. For example, when the reaction ratio of the electric booster is 10:1, 10% of the entire brake force is covered by the pedal force of the driver, and 90% of the entire brake force is covered by the electric booster. That is, the electric booster-based brake system having no pedal simulator mounted therein forms a pedal feel for the driver by having a part of the entire brake force covered by the pedal force of the driver.

ESC (Electronic Stability Control) refers to a system for enhancing the driving stability of a vehicle. When a vehicle makes a turn or changes lanes while traveling at medium or low speed, the vehicle is reliably steered according to a driver's intention. However, when a sudden change occurs in the road, vehicle speed or steering, the vehicle which has been stably driven may be under-steered or over-steered. In this situation, the ESC adjusts the brake force and engine power of the vehicle, thereby improving the driving stability of the vehicle.

At this time, the ECS calculates a brake pressure requirement through a stroke sensed by a pedal stroke sensor and pressure sensed by a sub master cylinder pressure sensor, and forms brake pressure by driving a motor according to the calculated brake pressure requirement.

The related art of the present disclosure is disclosed in Korean Patent Application Laid-Open No. 10-2008-0044300 published on May 20, 2008 and entitled "Vehicle Brake System".

When the brake system to which the electric booster with no pedal simulator is applied performs regenerative brake cooperation control, the electric booster may perform pedal force compensation control to remove a sense of difference. However, the brake system does not directly perform brake pressure control for cooperation control, but performs the brake pressure control for cooperation control using the ESC with a separate specification. Therefore, the manufacturing cost may be increased, or the regenerative brake cooperation control may be limited.

SUMMARY

Various embodiments are directed to a brake apparatus using an electric booster, which employs a reaction disk having such stiffness that a pedal force, varied by deformations in a central portion and an edge portion of a reaction disk by a change in pedal stepping force of a driver and a change in electromotive force of a motor, and a pedal force varied by a change in brake pressure can offset each other, in order to remove an influence on a pedal feel when an electric booster with no pedal simulator is applied to perform brake control, and performs cooperation control through an ESC in a non-linear section of a piston stroke depending on brake pressure and performs cooperation control through the electric booster in a linear section, and a control method thereof.

In an embodiment, a brake apparatus using an electric booster may include: an electric booster connected to a master cylinder and configured to pressure a push rod by pressurizing a reaction disk using an electromotive force of a motor with a pedal stepping force of a driver who steps on a brake pedal, and pressurize a piston of the master cylinder through the push rod; and a control unit configured to compare required brake pressure by the pedal stepping force of the driver and current brake pressure by the motor control to set pressure, and perform cooperation control through an ESC (Electronic Stability Control) and cooperation control through the electric booster.

The reaction disk may have such stiffness that a pedal force, which is varied according to deformations in a central portion and an edge portion of the reaction disk by a change in pedal stepping force of the driver who pressurizes the central portion of the reaction disk through the operating rod and a change in electromotive force of the motor which pressurizes the edge portion of the reaction disk through a bolt screw, and a pedal force which is varied according to a change in brake pressure offset each other.

The reaction disk may have such hardness and stiffness that a force less than 3 kgf is required to pressurize the reaction disk when only the central portion is pressurized only by the driver's force and compressed by 1 mm.

The reaction disk may have a thickness of at least 10 mm or more.

The reaction disk may have stiffness that satisfies the following equation:

$$C_1 < \frac{C_5}{a} + C_2 \times C_4 \times C_5$$

where $C_1$ represents the stiffness of the reaction disk, $C_2$ represents the reciprocal of (booster reaction ratio×pedal ratio), $C_4$ represents the cross-sectional area of the master cylinder, $C_5$ represents a change in pressure value depending on a piston displacement difference of 1 mm based on a required amount of liquid, and $a$ represents a pressure change during the regenerative brake cooperation control.

The set pressure may be set to such a value that the brake pressure by the piston stroke of the master cylinder is changed from a non-linear section to a linear section.

The control unit may perform cooperation control through the ESC when the required brake pressure and the current brake pressure are equal to or less than the set pressure, and perform cooperation control through the electric booster when the required brake pressure and the current brake pressure exceed the set pressure.

In an embodiment, there is provided a control method of a brake apparatus using an electric booster which is connected to a master cylinder and configured to pressure a push rod by pressurizing a reaction disk using an electromotive force of a motor with a pedal stepping force of a driver who steps on a brake pedal, and pressurize a piston of the master cylinder through the push rod. The control method may include: comparing, by a control unit, required brake pressure by the pedal stepping force of the driver and current brake pressure by the motor control to set pressure; and performing, by the control unit, cooperation control through an ESC and cooperation control through the electric booster according to the comparison result between the required brake pressure and the current brake pressure and the set pressure.

The reaction disk may have such stiffness that a pedal force, which is varied according to deformations of a central portion and an edge portion of the reaction disk by a change in pedal stepping force of the driver who pressurizes the central portion of the reaction disk through the operating rod and a change in electromotive force of the motor which pressurizes the edge portion of the reaction disk through a bolt screw, and a pedal force which is varied according to a change in brake pressure offset each other.

The set pressure may be set to such a value that the brake pressure by the piston stroke of the master cylinder is changed from a non-linear section to a linear section.

In the performing of the cooperation control through the ESC and the cooperation control through the electric booster according to the comparison results, the control unit may perform the cooperation control through the ESC when the required brake pressure and the current brake pressure are equal to or less than the set pressure, and perform the cooperation control through the electric booster when the required brake pressure and the current brake pressure exceed the set pressure.

In accordance with the embodiments of the present disclosure, the brake apparatus using an electric booster and the control method thereof may employ the reaction disk having stiffness at which the pedal force varied by the deformations of the central portion and the edge portion by the change in pedal stepping force of the driver and the change in electromotive force of the motor and the pedal force varied by the change in brake pressure can offset each other, such that the pedal feel is not affected when the electric booster with no pedal simulator is applied to perform braking control. Depending on the brake pressure, the brake apparatus may control the ESC to perform cooperation control in the non-linear section of the piston stroke, and control the electric booster to directly perform cooperation control in the linear section of the piston stroke. Therefore, in order to perform the regenerative brake cooperation control, the brake apparatus to which the electric booster is applied may use not a high-performance ESC but a general ESC, which makes it possible to not only reduce the manufacturing cost, but also minimize the constraint condition of the regenerative brake cooperation control.

DETAILED DESCRIPTION

Hereinafter, a brake apparatus using an electric booster and a control method thereof will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
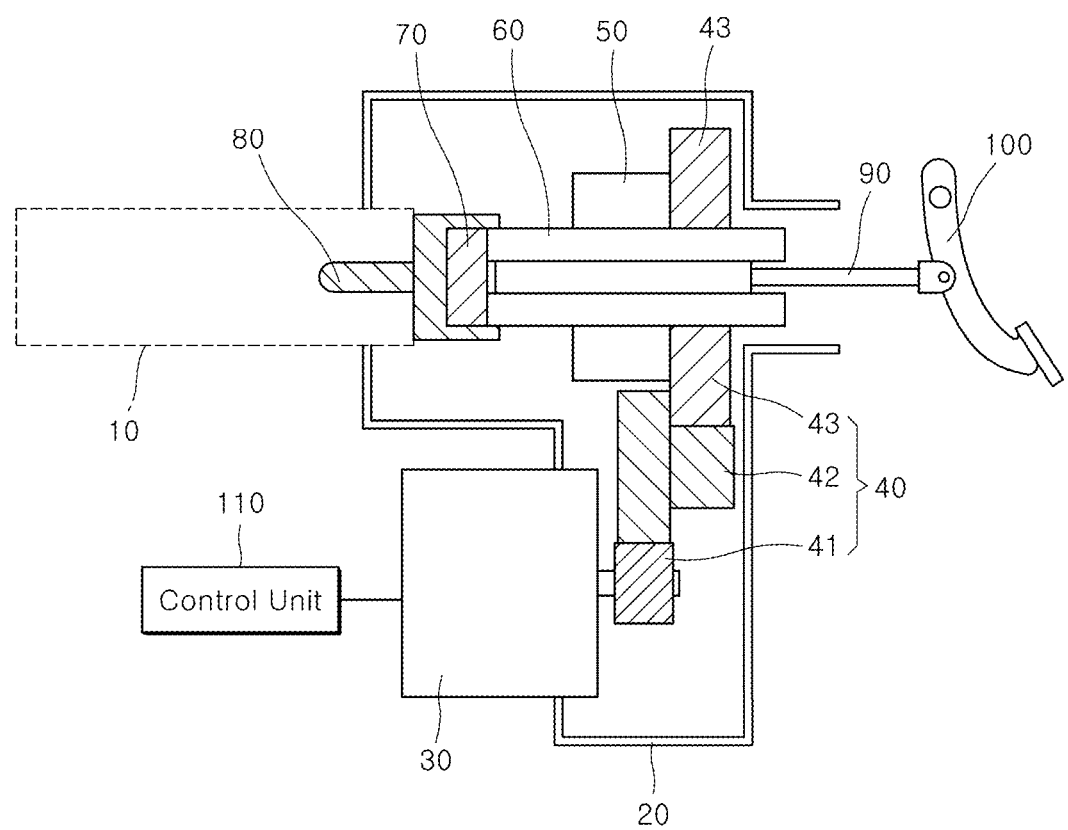
FIG. 1 is a configuration diagram schematically illustrating a brake apparatus using an electric booster in accordance with an embodiment of the present disclosure.
Figure 2:
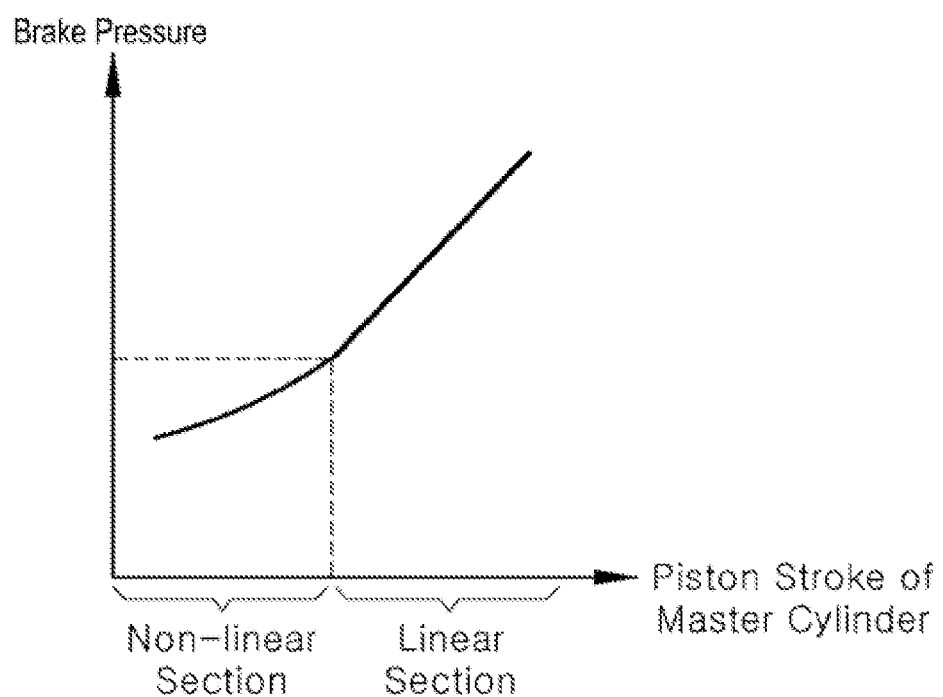
FIG. 2 is a graph illustrating the relationship between brake pressure and piston stroke of a master cylinder in the brake apparatus using an electric booster in accordance with the embodiment of the present disclosure.

FIG. 1 is a configuration diagram schematically illustrating a brake apparatus using an electric booster in accordance with an embodiment of the present disclosure, and FIG. 2 is a graph illustrating the relationship between brake pressure and piston stroke of a master cylinder in the brake apparatus using an electric booster in accordance with the embodiment of the present disclosure.

As illustrated in FIG. 1, the brake apparatus using an electric booster in accordance with the embodiment of the present disclosure may include an electric booster 20 which is connected to a master cylinder 10, and pressurizes a reaction disk 70 using an electromotive force of a motor 30 with a pedal stepping force of a driver who steps on a brake pedal 100, such that a piston of the master cylinder 10 is pressurized through a push rod 80 to generate a brake force.

The electric booster 20 has a structure in which a gear part 40 including first to third gears 41 to 43 is connected to the motor 30, a nut screw 50 is coaxially connected to the third gear 43 so as to rotate with the third gear 43, and a bolt screw 60 is screwed to the nut screw 50 through the rotation center axis of the nut screw 50 and converts a rotary motion of the nut screw 50 into a linear motion to pressurize the reaction disk 70.

Furthermore, an operating rod 90 is installed through a hollow portion of the bolt screw 60 in order to pressurize the reaction disk 70 using a driver's pedal stepping force.

Therefore, when the motor 30 is driven to generate a torque boosting force through the gear part 40, torque is transferred to the nut screw 50 by the third gear 43, and the rotary motion of the nut screw 50 is constrained to pressurize the edge portion of the reaction disk 70 through the linear motion of the bolt screw 60. Then, the push rod 80 generates a brake force by pressuring the piston of the master cylinder 10.

At this time, the central portion of the reaction disk 70 is pressurized by the operating rod 90 operated through the driver's pedal stepping force. Thus, the brake force is generated by the driver's pedal stepping force with the electromotive force generated by the motor 30.

According to the mechanism of the electric booster 20 to form a pedal feel, the driver's pedal stepping force is transferred to the push rod 80 through the reaction disk 70 via the operating rod 90, and the push rod 80 pressurizes the piston of the master cylinder 10. At this time, the driver's pedal force pressurizes the push rod 80 with the electromotive force generated by the motor 30, and the push rod 80 receives a part of a reaction force to the brake pressure according to a predetermined distribution ratio.

In the present embodiment, the reaction disk 70 is made of an elastic member such as rubber, and decided to have such stiffness that a pedal force varied by a change in brake pressure and a pedal force varied by deformations in the central portion and the edge portion of the reaction disk 70 can offset each other, the deformations being caused by a change in pedal stepping force of the driver who pressurizes the central portion of the reaction disk 70 through the operating rod 90 and a change in electromotive force of the motor 30 which pressurizes the edge portion of the reaction disk 70 through the bolt screw 60.

In the present embodiment, the reaction disk 70 may have hardness and stiffness at which a force of less than 3 kgf is required to pressurize the reaction disk 70, when only the central portion of the reaction disk is pressurized by only the driver's pedal stepping force and compressed by 1 mm. Furthermore, the reaction disk 70 may have a thickness of at least 10 mm or more.

The pedal force $F_{pedal\ force}$ and the brake pressure $F_{reaction\ pressure}$ may have relations as expressed by Equations 1 and 2 below.

$$F_{pedal\ force} = C_2 F_{reaction\ pressure} + C_3 \quad \text{[Equation 1]}$$

$$F_{pedal\ force} = C_1 \Delta d + C_2 F_{reaction\ pressure} - C_2 \Delta F_{reaction\ pressure} + C_3 \quad \text{[Equation 2]}$$

Equation 1 shows that a predetermined portion of the brake pressure $F_{reaction\ pressure}$ is transferred as the pedal force $F_{pedal\ force}$.

In Equation 2, $\Delta d$ indicates a difference which occurs due to a change in pressurization point between the central portion and the edge portion of the reaction disk 70, when the pressurization of the bolt screw 60 by the motor 30 is changed even though the pressurization position of the operating rod 90 by the driver is not changed, and $\Delta F_{reaction\ pressure}$ indicates a reaction force to a variation in brake pressure by the control of the motor 30.

In Equations 1 and 2, $C_1$, $C_2$ and $C_3$ represent constant values. Specifically, $C_1$ represents a constant value which is changed according to the stiffness of the reaction disk 70, $C_2$ represents a constant value which is decided according to a cross-section area ratio of the central portion of the reaction disk 70, pressurized by the operating rod 90, to the edge portion of the reaction disk 70, pressurized by the bolt screw 60, and $C_3$ represents a constant value decided by a return spring and the like.

That is, when the motor 30 moves backward the bolt screw 60 to lower pressure, the pedal force is increased by a factor caused by $\Delta d$, and decreased by a factor caused by $\Delta F_{reaction\ pressure}$.

In the present embodiment, a change in brake pressure at $\Delta d$ of 1 mm is checked according to the brake apparatus of the vehicle, and the constant value $C_1$ representing the stiffness of the reaction disk 70 is decided to make an increasing value $C_1 \Delta d$ and a decreasing value $C_2 \Delta F_{Fraction\ pressure}$ similar to each other. Thus, the influences on the two factors may offset each other.

Therefore, although the pressure is lowered or raised for regenerative brake cooperation control through the motor 30 of the electric booster 20 when the driver pressurizes the brake pedal 100 to the same position, the pedal force of the brake pedal 100 may not be changed to minimize a change in pedal feel.

That is, the stiffness of the reaction disk 70 may be designed to satisfy Equation 3.

$$C_1 < \frac{C_5}{a} + C_2 \times C_4 \times C_5 \quad \text{[Equation 3]}$$

In Equation 3, $C_1$ represents the stiffness of the reaction disk, $C_2$ represents the reciprocal of (booster reaction ratio × pedal ratio), $C_4$ represents the cross-sectional area of the master cylinder, $C_5$ represents a change in pressure value depending on a piston displacement difference of 1 mm based on the required amount of liquid, and a represents a pressure change during the regenerative brake cooperation control.

That is, the reaction disk 70 may be designed to have such stiffness that $C_1 \Delta d$ and $C_2 \Delta F_{Fraction\ pressure}$ offset each other in Equation 2. When $C_1 \Delta d - C_2 \Delta F_{Fraction\ pressure} = 0$, the reaction disk 70 has the most ideal stiffness.

Here, $\Delta d$ represents a relative displacement difference which occurs when only the motor 30 is moved while the operating rod 90 is not moved, and $\Delta F_{Fraction\ pressure}$ represents a change in reaction force due to a pressure difference caused by the relative displacement difference, and may be considered as (pressure difference × cross-sectional area of master cylinder).

As a result, $C_2$ becomes the reciprocal of (booster reaction ratio × pedal ratio).

In the case of a booster having a reaction ratio of 10:1 and a pedal ratio of 4:1, the pedal force is the final target value. Thus, $C_2$ becomes 0.025 which is the reciprocal of 40.

$$\Delta F_{reaction\ pressure} = C_4 \times \Delta P \quad \text{[Equation 4]}$$

In Equation 4, $C_4$ represents the cross-sectional area of the master cylinder, $\Delta P$ represents $C_5 \times \Delta d$, and $C_5$ represents a change in pressure value by the required amount of liquid depending on a piston displacement.

Therefore, the target equation, in which the pedal forces to offset each other are arranged with respect to $\Delta d$ based on Equations 2 and 4, is expressed by Equation 5.

$$(C_1 - C_2 \times C_4 \times C_5) \Delta d < \text{target value} \quad \text{[Equation 5]}$$

Here, when a pressure change required for regenerative brake cooperation control is defined as 20 bar in the case that $C_1$ represents the stiffness of the reaction disk, which needs to be designed, $C_2$ represents the reciprocal of (booster reaction ratio×pedal ratio), $C_4$ represents the cross-sectional area of the master cylinder, and $C_5$ represents a change in pressure value depending on a piston displacement difference of 1 mm based on the required amount of liquid, the target value needs to be a pedal force of 1 kgf. In this case, when $\Delta d$ is $20/C_5$ at 20 bar (=$C_5 \times \Delta d$), the target value becomes 1 kgf.

Therefore, since Equation 5 becomes $(C_1 - C_2 \times C_4 \times C_5) \times (20/C_5) < 1$, Equation 5 may be arranged as expressed by Equation 3, in order to design the stiffness of the reaction disk 70.

Here, a pedal force change of 1 kgf is a value through which the pedal force change is difficult to emotionally sense. When $C_2$ is set to 0.025 under the supposition that the reaction ratio is 10:1, $C_4$ is set to 5.06 indicating the cross-sectional area of the master cylinder having a piston diameter of 2.54 cm, and $C_5$ is set to about 5 based on the current required amount of liquid, $C_1$ representing the stiffness of the reaction disk 70 may be set to a smaller value than 0.88 kgf/mm. Since $C_1$ is set based on the pedal force (the position of the driver's foot), $C_1$ is multiplied by the pedal ratio of 4 so as to be corrected to a value based on the master cylinder shaft. Then, $C_1$ becomes about 3.5 kgf/mm.

That is, the stiffness of the reaction disk 70 may be set to such a value that requires a force of 3.5 kgf when only the central portion of the reaction disk 70 is pressurized and compressed by 1 mm.

At this time, the force of 3.5 kgf is a maximum value obtained by adding the stiffness of the reaction disk 70 and the influence of the return spring of the operating rod 90. Therefore, the reaction disk 70 may be actually designed to have hardness and stiffness at which a force of less than 3 kgf is required to pressurize the reaction disk 70, when only the central portion of the reaction disk 70 is pressurized by only the driver's force and compressed by 1 mm.

The calculated stiffness of the reaction disk 70, which is a force required to cause a difference in pressurization amount between the central portion and the edge portion by 1 mm, may have a linear relation depending on the pressurization positions of the central portion and the edge portion.

A control unit 110 may compare the required brake pressure by the pedal stepping force of the driver and the current brake pressure by control of the motor 30 to set pressure, and perform cooperation control through ESC (Electronic Stability Control) and cooperation control through the electric booster 20.

The set pressure may be set to such a value that the brake pressure by the piston stroke of the master cylinder 10 is changed from a non-linear section to a linear section as illustrated in FIG. 2.

As illustrated in FIG. 2, the increase in pressure with the change in piston stroke of the master cylinder 10 is divided into an initial invalid stroke section, a predetermined non-linear section, and a linear section having linear characteristics.

In the present embodiment, the stiffness of the reaction disk 70 is decided to make $C_1 \Delta d$ and $C_2 \Delta F_{reaction\ pressure}$ similar to each other, and $C_1 \Delta d$ already has a linear characteristic with respect to the pedal force due to the influence by the stiffness of the reaction disk 70. Therefore, since $C_2 \Delta F_{reaction\ pressure}$ is non-linear to $\Delta d$ in the non-linear section where the change in brake pressure by the piston stroke has a non-linear characteristic as illustrated in FIG. 2, the control unit 110 may perform the regenerative brake cooperation control through the ESC in the non-linear section, and perform the regenerative brake cooperation control through the electric booster 20 in the linear section.

That is, the control unit 110 may perform cooperation control through the ESC when the required brake pressure and the current brake pressure are less than the set pressure, and perform cooperation control through the electric booster 20 when the required brake pressure and the current brake pressure exceed the set pressure.

In accordance with the embodiment of the present disclosure, the brake apparatus using an electric booster may employ the reaction disk having stiffness at which the pedal force varied by the deformations in the central portion and the edge portion by the change in pedal stepping force of the driver and the change in electromotive force if the motor and the pedal force varied by the change in brake pressure can offset each other, such that the pedal feel is not affected when the electric booster with no pedal simulator is applied to perform braking control. Depending on the brake pressure, the brake apparatus may control the ESC to perform cooperation control in the non-linear section of the piston stroke, and control the electric booster to directly perform cooperation control in the linear section of the piston stroke. Therefore, in order to perform the regenerative brake cooperation control, the brake apparatus to which the electric booster is applied may use not high-performance ESC but general ESC, which makes it possible to not only reduce the manufacturing cost, but also minimize the constraint condition of the regenerative brake cooperation control.

Figure 3:
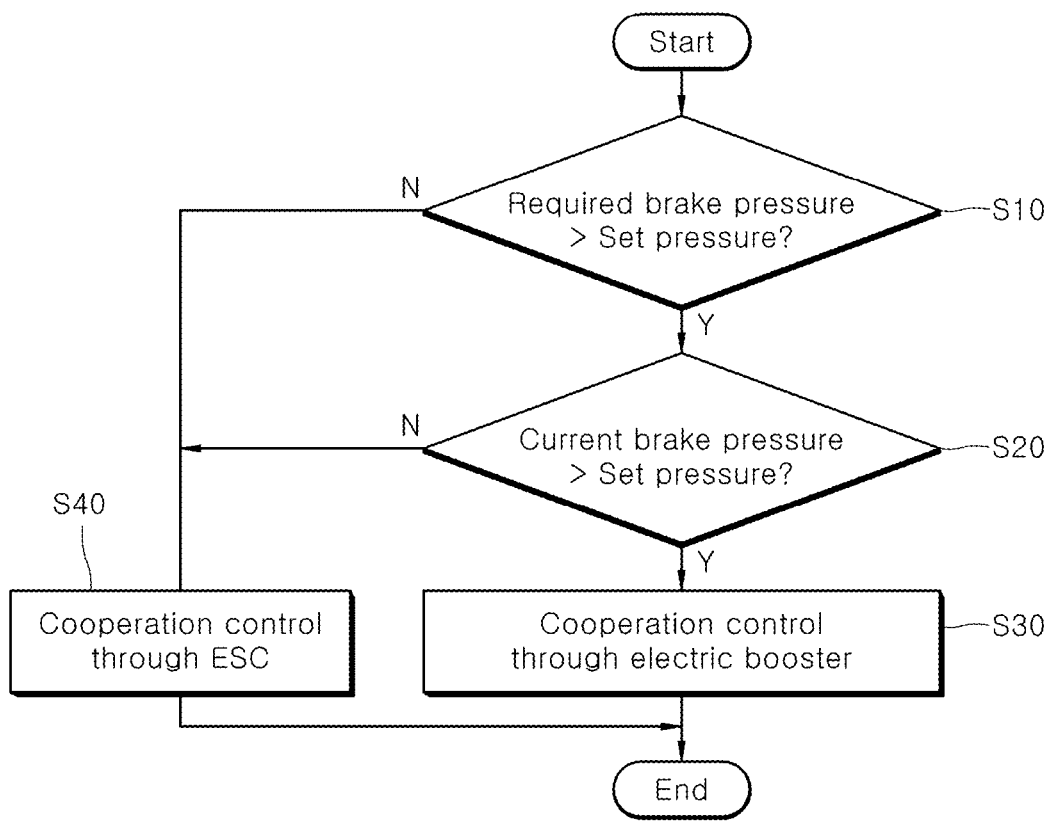
FIG. 3 is a flowchart for describing a control method of a brake apparatus using an electric booster in accordance with an embodiment of the present invention.

FIG. 3 is a flowchart for describing a control method of a brake apparatus using an electric booster in accordance with an embodiment of the present invention.

As illustrated in FIG. 3, the control method of the brake apparatus using an electric booster in accordance with the embodiment of the present invention is a control method for performing regenerative brake cooperation control through the ESC and the electric booster 20 in the brake apparatus using the electric booster 20 which is connected to the master cylinder 10, pressurizes the push rod 80 by pressurizing the reaction disk 70 using an electromotive force of the motor 30 with a pedal stepping force of a driver who steps on the brake pedal, and pressurizes the piston of the master cylinder 10 through the push rod 80.

For this control method, the reaction disk 70 of the electric booster 20 may be designed to have such stiffness that can offset deformations in the central portion and the edge portion of the reaction disk 70 by a change in pedal stepping force of the driver who pressurizes the central portion of the reaction disk 70 through the operating rod 90 and a change in electromotive force of the motor 30 which pressurizes the edge portion of the reaction disk 70 through the bolt screw 60. Thus, although the pressure is lowered or raised for the regenerative brake cooperation control through the motor 30 of the electric booster 20 when the driver pressurizes the brake pedal 100 to the same position, the pedal force of the brake pedal 100 may not be changed to minimize a change in pedal feel.

The control unit 110 of the brake apparatus, to which the electric booster 20 having such characteristics is applied, compares the required brake pressure by the driver's pedal stepping force to the set pressure in step S10.

The set pressure may be set to such a value that the brake pressure by the piston stroke of the master cylinder 10 is changed from a non-linear section to a linear section as illustrated in FIG. 2.

When the comparison result of step S10 indicates that the required brake pressure is equal to or less than the set pressure, the control unit 110 performs the regenerative brake cooperation control through the ESC in step S40.

On the other hand, when the comparison result of step S10 indicates that the required brake pressure exceeds the set pressure, the control unit 110 compares the current brake pressure by control of the motor 30 to the set pressure in step S20.

When the comparison result of step S20 indicates that the current brake pressure is equal to or less than the set pressure, the control unit 110 performs the regenerative brake cooperation control through the ESC in step S40.

On the other hand, when the comparison result of step S20 indicates that the current brake pressure exceeds the set pressure, the control unit 110 performs the regenerative brake cooperation control through the electric booster 20 in step S30.

That is, as illustrated in FIG. 2, the increase in pressure with the change in piston stroke of the master cylinder 10 is divided into an initial invalid stroke section, a predetermined non-linear section, and a linear section having linear characteristics.

In the present embodiment, the stiffness of the reaction disk 70 is decided to make $C_1 \Delta d$ and $C_2 \Delta F_{reaction\ pressure}$ similar to each other, and $C_1 \Delta d$ already has a linear characteristic with respect to the pedal force due to the influence by the stiffness of the reaction disk 70. Therefore, since $C_2 \Delta F_{reaction\ pressure}$ is non-linear to $\Delta d$ in the non-linear section where the change in brake pressure by the piston stroke has a non-linear characteristic as illustrated in FIG. 2, the control unit 110 may perform the regenerative brake cooperation control through the ESC in the non-linear section, and perform the regenerative brake cooperation control through the electric booster 20 in the linear section.

Therefore, the control unit 110 may perform the regenerative brake cooperation control through the ESC when the required brake pressure and the current brake pressure are equal to less than the set pressure, and perform the regenerative brake cooperation control through the electric booster 20 when the required brake pressure and the current brake pressure exceed the set pressure.

In accordance with the embodiment of the present disclosure, the control method of the brake apparatus using an electric booster may employ the reaction disk having stiffness at which the pedal force varied by the deformations of the central portion and the edge portion by the change in pedal stepping force of the driver and the change in electromotive force of the motor and the pedal force varied by the change in brake pressure can offset each other, such that the pedal feel is not affected when the electric booster with no pedal simulator is applied to perform braking control. Depending on the brake pressure, the brake apparatus may control the ESC to perform cooperation control in the non-linear section of the piston stroke, and control the electric booster to directly perform cooperation control in the linear section of the piston stroke. Therefore, in order to perform the regenerative brake cooperation control, the brake apparatus to which the electric booster is applied may use not a high-performance ESC but a general ESC, which makes it possible to not only reduce the manufacturing cost, but also minimize the constraint condition of the regenerative brake cooperation control.

The embodiments described in this specification may be implemented with a method or process, a device, a software program, a data stream or a signal, for example. Although the embodiments have been discussed in the context of a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which can facilitate communication of information between an end user and the processor.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus comprising:
an electric booster connected to a master cylinder and configured to:
pressure a push rod by pressurizing a reaction disk with an electromotive force from a motor and a pedal stepping force from a brake pedal stepped on by a driver; and
pressurize, using the push rod, a piston of the master cylinder; and
a control unit configured to:
compare a required brake pressure determined based on the pedal stepping force to a preset pressure;
compare a current brake pressure generated by the motor to the preset pressure;
determining whether the required brake pressure and the current brake pressure are greater than the preset pressure;
in response to determining that the required brake pressure and the current brake pressure are greater than the preset pressure, cause the electric booster to perform a regenerative brake cooperation control; and
in response to determining that the required brake pressure or the current brake pressure is not greater than the preset pressure, cause an electronic stability control (ESC) system to perform the regenerative brake cooperation control.

2. The brake apparatus of claim 1, wherein the preset pressure is set to a value at which a brake pressure by a piston stroke of the master cylinder is changed from a non-linear section to a linear section.

3. The brake apparatus of claim 1, wherein a stiffness of the reaction disk is such that a first pedal force, which is varied according to deformations in a central portion and an edge portion of the reaction disk by a first change to the pedal stepping force which pressurizes the central portion of the reaction disk by operating the push rod and a second change to the electromotive force of the motor which pressurizes the edge portion of the reaction disk through a bolt screw, and a second pedal force which is varied according to a change to a brake pressure offset each other.

4. The brake apparatus of claim 3, wherein a hardness and the stiffness of the reaction disk is such that a force of less than 3 kgf is required to pressurize the reaction disk when only the central portion is pressurized only by the pedal ping force and compressed by 1 mm.

5. The brake apparatus of claim 3, wherein the reaction disk has a thickness of at least 10 mm.

6. The brake apparatus of claim 3, wherein the stiffness of the reaction disk satisfies the following equation:

$$C_1 < \frac{C_5}{a} + C_2 \times C_4 \times C_5$$

where C1 represents the stiffness of the reaction disk, C2 represents a reciprocal of a booster reaction ratio multiplied by a pedal ratio, C4 represents a cross-sectional area of the master cylinder, C5 represents a change to a pressure value depending on a piston displacement difference of 1 mm based on a required amount of liquid, and a represents a pressure change during the regenerative brake cooperation control.

7. A method of controlling a brake apparatus using an electric booster connected to a master cylinder, wherein the electronic booster is configured to pressure a push rod by pressurizing a reaction disk with an electromotive force of a motor and a pedal stepping force from a brake pedal stepped on by a driver, the master cylinder having a piston configured to be pressurized when the push rod is pressured, the method comprising:

comparing a required brake pressure that is determined based on the pedal stepping force to a preset pressure;

comparing a current brake pressure generated by the motor to the preset pressure;

determining whether the required brake pressure and the current brake pressure are greater than the preset pressure;

in response to determining that the required brake pressure and the current brake pressure are greater than the preset pressure, causing the electronic booster to perform a regenerative brake cooperation control; and in response to determining that the required brake pressure or the current brake pressure is not greater than the preset pressure, causing an electronic stability control (ESC) system to perform the regenerative brake cooperation control.

8. The method of claim 7, wherein a stiffness of the reaction disk is such that a first pedal force, which is varied according to deformations of a central portion and an edge portion of the reaction disk by a first change to the pedal stepping force that pressurizes the central portion of the reaction disk by operating the push rod and a second change to the electromotive force of the motor which pressurizes the edge portion of the reaction disk through a bolt screw, and a second pedal force which is varied according to a change to a brake pressure offset each other.

9. The method of claim 7, wherein the preset pressure is set to a value at which a brake pressure by a piston stroke of the master cylinder is changed from a non-linear section to a linear section.

* * * * *